May 8, 1923.
T. B. JENKINS
TIRE TOOL
Filed Jan. 13, 1922
1,454,320
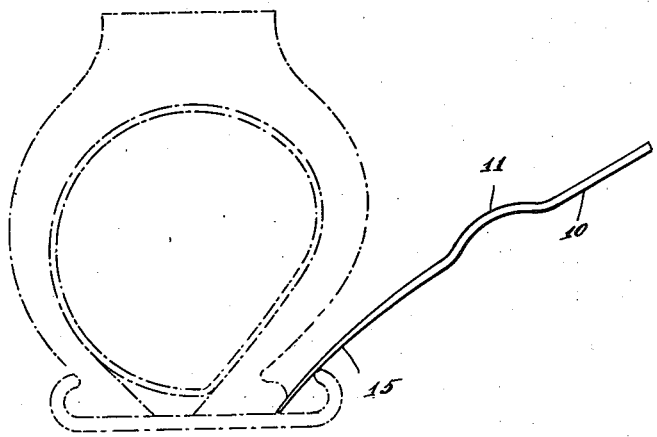
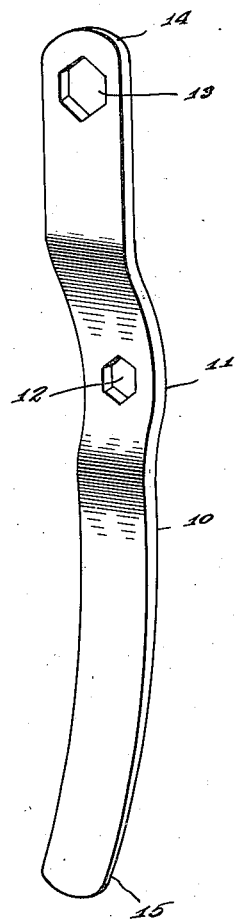
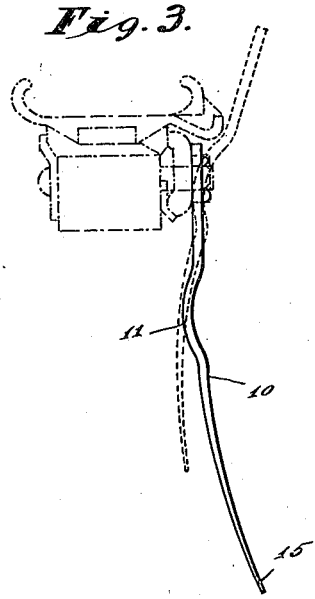
Inventor
Thomas B. Jenkins,
By Arthur M. Hood
Attorney Patented May 8, 1923.

1,454,320

UNITED STATES PATENT OFFICE.

THOMAS BRACEY JENKINS, OF RICHMOND, INDIANA, ASSIGNOR TO JENKINS VULCAN SPRING COMPANY, OF RICHMOND, INDIANA, A CORPORATION OF INDIANA.

TIRE TOOL.

Application filed January 13, 1922. Serial No. 528,941.

*To all whom it may concern:*

Be it known that I, THOMAS B. JENKINS, a citizen of the United States, residing at Richmond, in the county of Wayne and State of Indiana, have invented a new and useful Tire Tool, of which the following is a specification.

The object of my invention is to provide a simple and efficient tool, which may be conveniently carried by an automobile, for facilitating the removal of detachable tires from the carrying wheel and for removing the tire itself from the supporting rim.

The accompanying drawings illustrate my invention. Fig. 1 is a perspective view of the tool; Fig. 2, a side elevation showing the manner of its use in removing the tire from the rim; and Fig. 3, a side elevation showing the manner of its use in removing the nuts which retain a detachable rim upon a wheel.

The tool consists of a strip 10 of tempered spring steel somewhat similar to a leaf of a leaf spring. At an intermediate point the strip 10 is laterally displaced to form a bulge 11 which is perforated at 12 in such form as to properly embrace the nut of a bolt which is commonly used for retaining a detachable tire rim upon a wheel. The bulge 11 is preferably comparatively close to one end of the strip 10 and its lateral displacement from the main line of the strip is such as to permit application to the nut referred to in such manner that both ends of the strip will clear the rim in turning the nut in either direction. The end of strip 10 which is nearest the bulge 11 is perforated at 13 in such form as to embrace the tire retaining nuts, and the adjacent end of the strip is rounded as indicated at 14 to provide for proper clearances. Strip 10, at the end opposite the perforation 13, is thinned so as to form a comparatively thin end 15 which may be readily inserted between the rim and tire so that the tire may be pried loose from the rim.

In many instances the tire retaining nut may be loosened and removed by applying the tool to the nut at the perforation 12; but if the nut is set up especially hard, a greater leverage is required to start the nut and it is for this reason that the perforation 13 is provided, thus furnishing a longer leverage through which force can be exerted on the nut through an angle of about 120° and, after the nut has been loosened, the tool may be shifted so that perforation 12 is applied to the nut and thereafter the nut can be continuously turned off.

I claim as my invention:

As an article of manufacture, a tire tool consisting of a substantially rigid but resilient metal strip having a lateral bulge at an intermediate point, said bulge being provided with a nut receiving and turning portion.

In witness whereof I, THOMAS B. JENKINS, have hereunto set my hand at Richmond, Indiana, this 15th day of December, A. D. one thousand nine hundred and twenty-one.

THOMAS BRACEY JENKINS.